(12) United States Patent
Kidd et al.

(10) Patent No.: US 10,302,034 B2
(45) Date of Patent: May 28, 2019

(54) EXHAUST AFTERTREATMENT THERMAL MANAGEMENT CONTROLS

(71) Applicant: Cummins Inc., Columbus, IN (US)

(72) Inventors: Adam W. Kidd, Indianapolis, IN (US); Hoseinali Borhan, Bloomington, IN (US); Bibin N. Pattel, Columbus, IN (US); Edmund P. Hodzen, Columbus, IN (US); Michael Haas, Columbus, IN (US); Jeffrey Diwakar Abraham, Columbus, IN (US); Bryon D. Staebler, Columbus, IN (US)

(73) Assignee: Cummins Inc., Columbus, IN (US)

(*) Notice: Subject to any disclaimer, the term of this patent is extended or adjusted under 35 U.S.C. 154(b) by 41 days.

(21) Appl. No.: 15/416,622

(22) Filed: Jan. 26, 2017

(65) Prior Publication Data

US 2017/0211493 A1 Jul. 27, 2017

Related U.S. Application Data

(60) Provisional application No. 62/287,495, filed on Jan. 27, 2016.

(51) Int. Cl.
*F02D 41/02* (2006.01)
*B01D 53/94* (2006.01)
(Continued)

(52) U.S. Cl.
CPC ....... *F02D 41/025* (2013.01); *B01D 53/9418* (2013.01); *B01D 53/9477* (2013.01);
(Continued)

(58) Field of Classification Search
CPC ............ B01D 53/9477; B01D 53/9418; B01D 53/9495; F01N 3/208; F01N 2590/11;
(Continued)

(56) References Cited

U.S. PATENT DOCUMENTS

| 8,015,805 B2 | 9/2011 | Pfaeffle et al. |
| 8,392,091 B2 | 3/2013 | Hebbale et al. |

(Continued)

FOREIGN PATENT DOCUMENTS

| EP | 1195508 | 4/2002 |
| GB | 2393404 | 3/2004 |

(Continued)

*Primary Examiner* — Patrick D Maines
*Assistant Examiner* — Dapinder Singh
(74) *Attorney, Agent, or Firm* — Taft Stettinius & Hollister LLP

(57) ABSTRACT

One exemplary embodiment is a method of operating a system comprising an internal combustion engine system, and an exhaust aftertreatment system comprising an SCR catalyst, and an electronic control system. The method comprises operating the electronic control system to perform the acts of determining a predicted temperature value indicative of a predicted future temperature of the SCR catalyst, determining a temperature profile value using the predicted temperature value and a current temperature value indicative of a current temperature of the SCR catalyst, operating a controller to provide an output indicating a difference between the temperature profile value and a temperature target, determining a heat request using the output of the controller, filtering the heat request using a prediction horizon, and controlling operation of the engine system using the filtered heat request to increase a temperature of the SCR catalyst.

20 Claims, 6 Drawing Sheets

(51) Int. Cl.
*F01N 3/20* (2006.01)
*F02D 41/14* (2006.01)
*F02D 41/30* (2006.01)

(52) U.S. Cl.
CPC ......... *B01D 53/9495* (2013.01); *F01N 3/208* (2013.01); *F02D 41/024* (2013.01); *F02D 41/1401* (2013.01); *F02D 41/1402* (2013.01); *F02D 41/3005* (2013.01); *F01N 2590/11* (2013.01); *F01N 2610/02* (2013.01); *F01N 2900/0404* (2013.01); *F01N 2900/0408* (2013.01); *F01N 2900/0601* (2013.01); *F01N 2900/0602* (2013.01); *F01N 2900/10* (2013.01); *F01N 2900/12* (2013.01); *F01N 2900/1602* (2013.01); *F02D 2041/1409* (2013.01); *F02D 2041/1432* (2013.01); *F02D 2200/0804* (2013.01); *F02D 2200/101* (2013.01); *F02D 2200/501* (2013.01); *F02D 2200/701* (2013.01); *F02D 2200/702* (2013.01); *Y02A 50/2325* (2018.01); *Y02T 10/24* (2013.01); *Y02T 10/26* (2013.01)

(58) Field of Classification Search
CPC ......... F01N 2610/02; F01N 2900/0404; F01N 2900/0408; F01N 2900/0601; F01N 2900/0602; F01N 2900/10; F01N 2900/12; F01N 2900/1602; F02D 41/024; F02D 41/1401; F02D 41/1402; F02D 41/3005; F02D 2041/1409; F02D 2041/1432; Y02T 10/24; Y02T 10/26
USPC .......................................... 60/295, 299–301
See application file for complete search history.

(56) References Cited

U.S. PATENT DOCUMENTS

| | | | |
|---|---|---|---|
| 8,577,568 | B2 | 11/2013 | Sujan et al. |
| 8,818,659 | B2 | 8/2014 | Sujan et al. |
| 2006/0277898 | A1 | 12/2006 | McCarthy |
| 2010/0050614 | A1 | 3/2010 | Parmentier |
| 2011/0072798 | A1* | 3/2011 | Herman ............ F01N 3/208 60/286 |
| 2011/0146235 | A1* | 6/2011 | Hagimoto ......... F01N 3/2066 60/274 |
| 2013/0263575 | A1* | 10/2013 | Sun ................... F01N 11/00 60/274 |
| 2013/0289857 | A1 | 10/2013 | Schmitt | 
| 2015/0113947 | A1 | 4/2015 | Ancimer et al. |

FOREIGN PATENT DOCUMENTS

| | | |
|---|---|---|
| JP | 2009293409 | 12/2009 |
| JP | 2012026375 | 2/2012 |

* cited by examiner

EXHAUST AFTERTREATMENT THERMAL MANAGEMENT CONTROLS

CROSS-REFERENCE

The present application claims the benefit of and priority to U.S. Application No. 62/287,495 filed on Jan. 27, 2016 which is hereby incorporated by reference.

BACKGROUND

The present application relates generally to apparatuses, methods and systems for thermal management of exhaust aftertreatment systems including SCR catalysts and controls for the same. Exhaust aftertreatment systems including SCR catalysts are useful to reduce emissions oxides of nitrogen (NOx) as well as other pollutants from vehicles and other systems including internal combustion engines. SCR catalysts require a minimum temperature to operate at or above a desired conversion efficiency. Present approaches to thermal management of exhaust aftertreatment systems including SCR catalysts suffer from a number of shortcomings including those respecting aftertreatment system efficiency and fuel consumption among others. There remains a significant need for the unique and inventive apparatuses, methods, systems and controls disclosed herein.

DISCLOSURE

For the purposes of clearly, concisely and exactly describing exemplary embodiments of the disclosure, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created, and that the invention includes and protects such alterations, modifications, and further applications of the exemplary embodiments as would occur to one skilled in the art.

SUMMARY OF THE DISCLOSURE

Exemplary embodiments include unique methods, systems and apparatuses for thermal management of exhaust aftertreatment systems including SCR catalysts. Further embodiments, forms, objects, features, advantages, aspects, and benefits shall become apparent from the following description and drawings.

DETAILED DESCRIPTION OF ILLUSTRATIVE EMBODIMENTS

Figure 1:
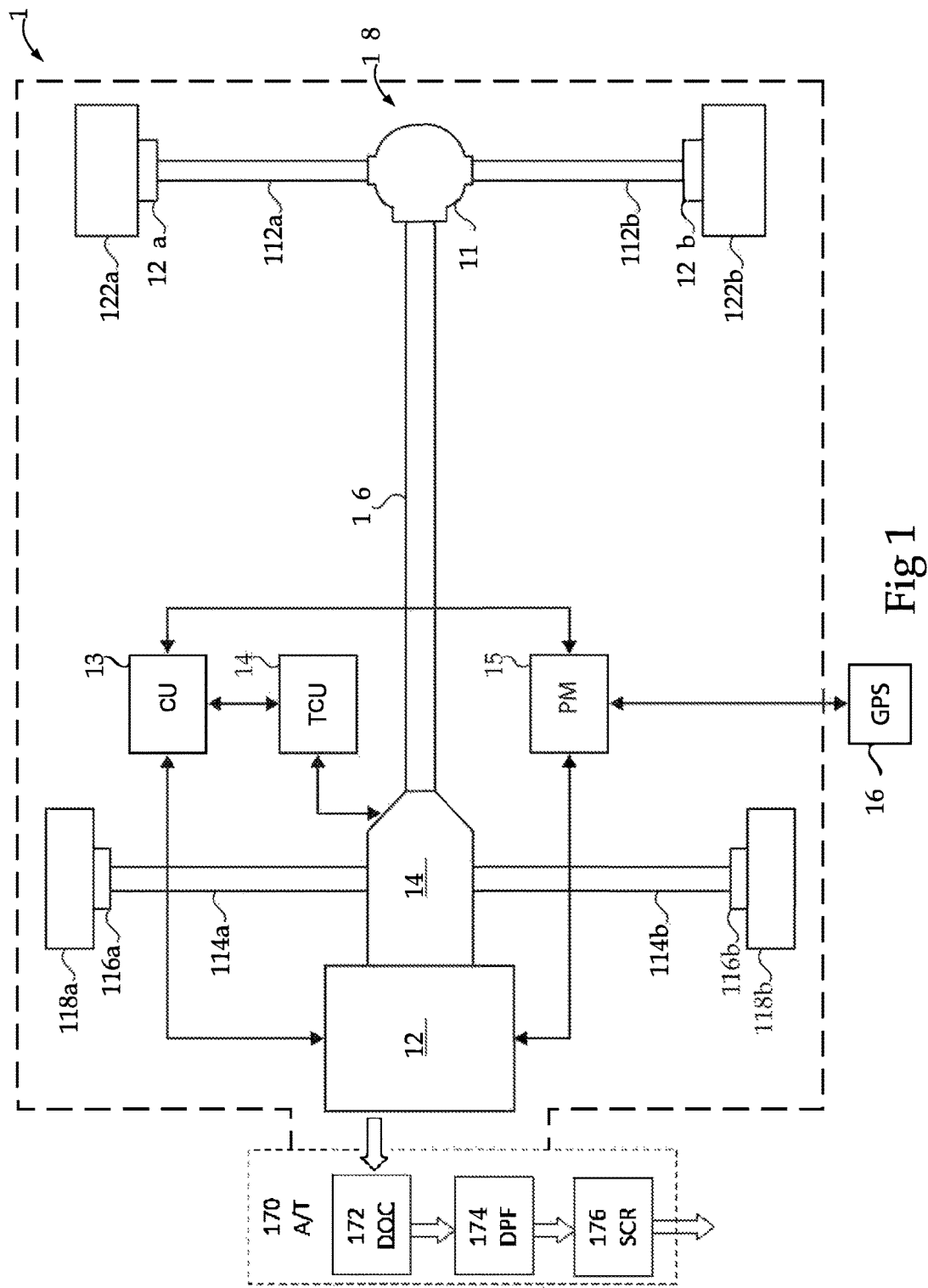
FIG. 1 is a schematic illustration of an exemplary vehicle system.

With reference to FIG. 1 there is illustrated a schematic view of an exemplary vehicle system 100 including a prime mover structured to provide motive power for the vehicle system 100. In the illustrated embodiment the prime mover is structured as an internal combustion engine 102. In other embodiments the prime mover may be structured differently, for example, as a hybrid electric prime mover including an engine and one or more electric machines or as a pneumatic hybrid prime mover including an engine and one or more pneumatic systems. It shall be understood that the description referring to engine 102 is also applicable to these and other types of prime movers. The vehicle system 100 further includes a transmission 104 operably connected to the engine 102 for receiving the output torque of the engine 102 and transmitting the output torque to a drive shaft 106. The vehicle system 100 illustrated in FIG. 1 is structured in a rear wheel drive configuration including a final drive 108 having a rear differential 110 connecting the drive shaft 106 to rear axles 112a and 112b. It is contemplated that the components of vehicle system 100 may be positioned in different locations throughout the vehicle system 100. In one non-limiting example, in a vehicle having a front wheel drive configuration, the transmission may be a transaxle and the final drive may reside at the front of the vehicle to connect front axles to the engine via the transaxle.

In the illustrated embodiment, vehicle system 100 further includes two front brakes 116a and 116b, each positioned between and operably connected to two front wheels 118a and 118b and front axles 114a and 114b, respectively. Vehicle system 100 further includes two rear brakes 120a and 120b, each positioned between two rear wheels 122a and 122b and rear axles 112a and 112b, respectively. It is contemplated that vehicle system 100 may have more or fewer tires and/or brakes than illustrated in FIG. 1.

Vehicle system 100 includes exhaust aftertreatment system 170 which is structured to receive exhaust from engine 102. Exhaust aftertreatment system 170 includes a diesel oxidation catalyst (DOC) 172, a diesel particulate filter (DPF) 174, and an SCR catalyst 176 which are flow coupled in series. Exhaust aftertreatment system also includes an injector system structured to provide a reductant to the SCR catalyst 176 and sensors which are structured to output information indicative of DOC outlet temperature, DPF outlet temperature and SCR catalyst bed temperature and provide such information to one or more control units of vehicle system 100. In various embodiments, the sensors may be physical sensors, virtual sensors or combinations thereof. Vehicle system 100 also includes an engine intake system which may include one or more turbochargers, charge coolers, controllable exhaust gas recirculation (EGR) circuits, and EGR coolers.

Vehicle system 100 includes an engine control unit (ECU) 130, sometimes referred to as an engine control module (ECM), or the like, which is directed to regulating and controlling the operation of engine 102. System 100 further includes a transmission control unit (TCU) 140 which is directed to the regulation and control of transmission 104. ECU 130 and TCU 140 are each in electrical communication with one another as well as with a plurality of sensors, actuators and additional components of vehicle system 100 via controller area network (CAN) 155. ECU 130 and TCU 140 may be structured to receive a variety of operational information relating to vehicle system 100 including, for example, engine speed, transmission speed, engine torque, engine power, gear selection, accelerator position, brake pedal position, ambient temperature, turbocharger boost pressure, intake manifold pressure, intake manifold temperature, exhaust manifold pressure, exhaust manifold temperature, local horizon prediction information, inclinometer information, and GPS or telematics information. The foregoing information may be provided by physical sensors, virtual sensors or combinations thereof.

In certain embodiments, the ECU 130 and the TCU 140 may be combined into a single control module, commonly referred to as a powertrain control module (PCM) or powertrain control unit (PCU), or the like. It is contemplated that ECU 130 may be integrated with the engine 102 and/or TCU 140 may be integrated with transmission 104. Other electronic control units for vehicle subsystems may also be present in vehicle system 100, such as a braking system electronic control unit and a cruise control electronic control unit, for example.

Vehicle system 100 further includes an engine power management (EPM) controller 150 operably connected to the ECU 130 for receiving vehicle system 100 sensor data and conditions. EPM controller 150, which may be dedicated to some or all of the controls and processes disclosed in further detail below as well as to additional control for the regulation and control of the engine in vehicle system 100. In the illustrated embodiment, EPM controller 150 is in electrical communication with the ECU 130. It is contemplated that in certain embodiments EPM controller may be in electrical communication with TCU 140. In certain embodiments, a portion of the EPM controller 150 or the entire EPM controller may be integrated within the ECU 130 and/or TCU 140. EPM controller 150 may further be in electrical communication with one or more of the plurality of vehicle sensors in vehicle system 100 for receiving and transmitting conditions of vehicle system 100, such as temperature and pressure conditions, for example.

In the exemplary embodiment illustrated in FIG. 1, a navigation and positioning system 160, such as a global position system (GPS) device mounted external to vehicle system 100 and/or an electronic horizon device connected to vehicle system 100, may be electronically connected to EPM controller 150 for the purpose of providing future route grade information, future speed limit information, and/or future traffic speed information, as well as other look ahead or forecast information. In certain embodiments, additional information from the navigation and positioning system 160 may be transmitted to the EPM controller 150, such as traffic conditions, road conditions, elevation, and/or weather conditions, for example. It is contemplated that in certain embodiments, specifically where a navigation and positioning system 160 is not connected to EPM controller 150, that route grade information may be programmed into memory and accessed by the EPM controller 150 while the vehicle is travelling along the travel route.

It is contemplated that that the controls, control systems, and control devices disclosed herein may be utilized in connection with intelligent transport systems and services (ITS) which comprises systems that integrate of information and communication technologies with transport infrastructure to improve economic performance, safety, mobility and environmental sustainability. An exemplary ITS system includes three operational layers: a data collection layer, a data aggregation and translation layer and an information dissemination layer.

The data collection layer may include EPM controller 150 and system 160 as well as devices and systems on a plurality of vehicles which sense and transmit data associated a plurality of vehicles at particular geographical locations. The data collection layer may further include sensors, cameras and other data sources which are fixed relative to a roadway, or information from sensors, cameras and other data sources which are provided on surveillance vehicles such as planes and helicopters.

The data aggregation and translation layer comprises one or more computer based systems which receive and aggregate data from the data collection layer devices and process the received data to provide information about one or more roadway or traffic conditions. In certain aspect, the received data may include information about road grade, speed limits, vehicle rate of speed, or change in rate of speed at particular locations which may be aggregated and processed to determine traffic speed over a given segment of roadway. In other aspects, information about weather conditions such as wind speed, precipitation and road conditions may be derived.

The information dissemination layer may include EPM controller 150 and system 160 as well as devices and systems on a plurality of vehicles which receive information transmitted from the data aggregation and translation layer. The received information may include road grade information, information about traffic speed over a given segment of roadway, information about speed limits, as well as information about weather conditions such as wind speed, precipitation and road conditions may be derived. As further described below, ITS information from one or more of the foregoing layers may be utilized in connection with the controls, control systems, and control devices disclosed herein.

It is contemplated that at least a portion of the conditions and/or measured inputs required for interpreting signals by the EPM controller 150 may be received from ECU 130 and/or TCU 140, in addition to or alternatively to the plurality of vehicle sensors. It is further contemplated that in certain embodiments ECU 130, TCU 140, and EPM controller 150 may transmit data communication messages across a CAN 155. It shall be appreciated that ECU 130, TCU 140 and EPM 150 comprise components of an exemplary electronic control system. A variety of other electronic control system configurations in which such units and their functionalities are combined into a common unit or module or are differently distributed among units or modules are also contemplated.

Electronic control systems implementing the controls disclosed herein may utilize received data and signal inputs, stored data values, constants, and functions, as well as computer executable operating instructions stored on one or more non-transitory computer readable media. The control operations and processes disclosed herein may be performed at least in part by EPM 150, TCU 140, ECU 130, or combinations thereof as well as in other controllers and control units or combinations including the same. The illustrated controls and control processes are understood to be exemplary only, and operations may be combined or divided, and added or removed, as well as re-ordered in whole or part, unless stated explicitly to the contrary herein.

Figure 2:
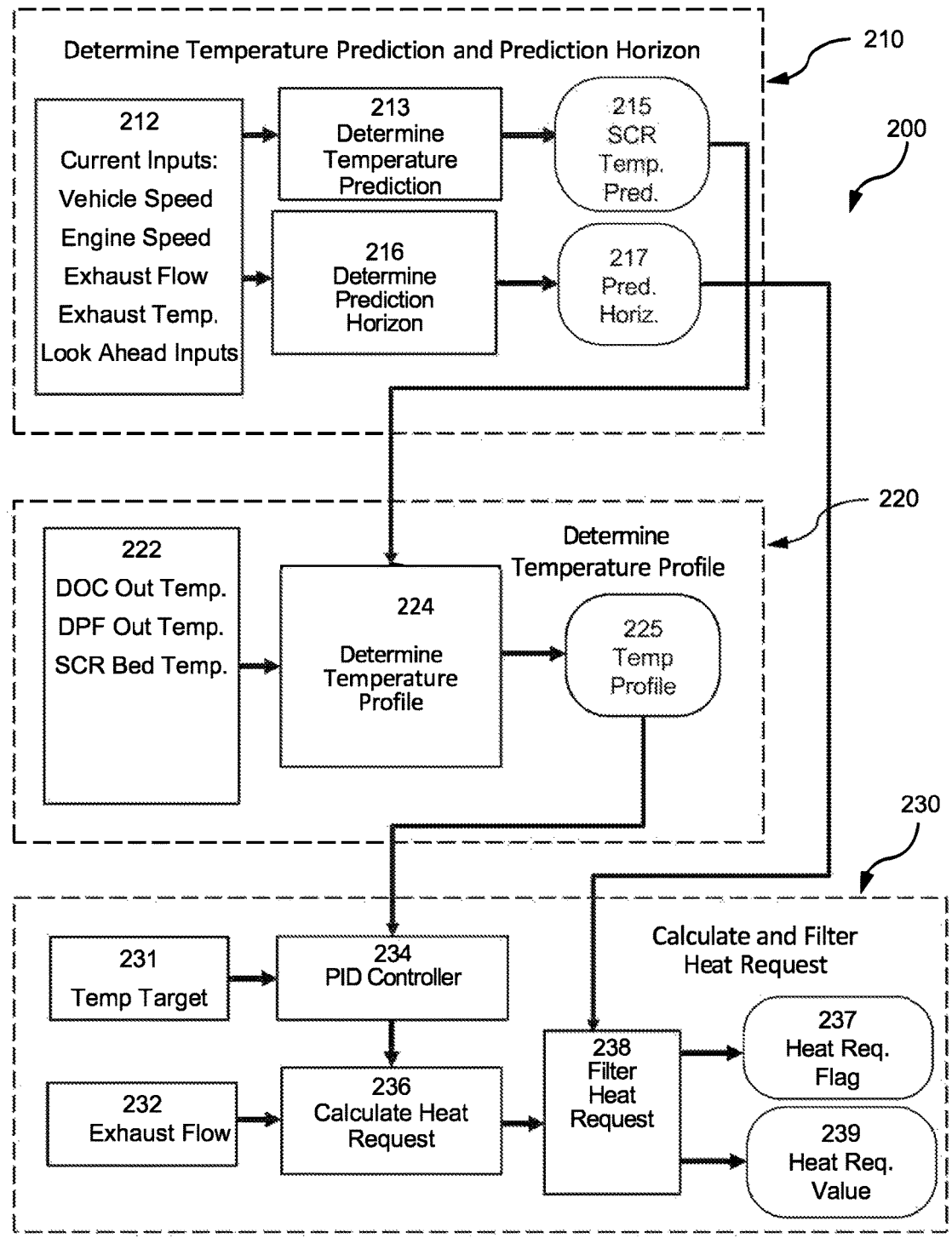
FIGS. 2-5 are block diagrams illustrating exemplary aspects of controls for an exhaust aftertreatment system.

With reference to FIG. 2 there is illustrated a schematic block diagram of exemplary controls 200. Controls 200 may be implemented in one or more electronic control units of an electronic control system. For example, in the embodiment illustrated in FIG. 1 controls 200 may be implemented in ECU 130, TCU 140, EPM controller 150 or a combination thereof. Controls 200 are structured to provide thermal management of an exhaust aftertreatment system including an SCR catalyst.

Controls 200 include a set of blocks 210 which are structured to determine predicted temperature values indicative of predicted future temperatures of an SCR catalyst and to determine a prediction horizon for the predicted temperature values. Inputs 212 are provided to blocks 213 and 216. In the illustrated embodiment, inputs 212 comprise vehicle speed, engine speed, exhaust flow and exhaust temperature each of which are indicative of an aspect of current vehicle system operation. Inputs 212 further comprise look-ahead information indicating future operating conditions to be encountered by a vehicle, for example, future vehicle speed and future road grade over a prediction horizon defined in terms of travel time or distance traveled. It is contemplated that additional and/or alternate inputs may be utilized. It shall be appreciated that, like the other input parameters disclosed herein, inputs 212 may be determined using one or more physical sensors, virtual sensors, controller-based estimations or models, or combinations thereof.

Blocks 213 and 216 are structured to utilize a dynamic engine model that receives the look-ahead information indicating future operating conditions to be encountered by a vehicle as well as inputs 212 which are indicative of aspects of current operating conditions. Block 213 is structured to determine predicted temperature values indicative of predicted future temperatures of the SCR catalyst and to output a predicted temperature value 215 which may be re-determined and updated repeatedly. Block 216 is structured to determine and output a time or distance prediction horizon 217 for the predicted temperature value 215 which may also be re-determined and updated repeatedly. Further details of certain aspects of one exemplary implementation of the features of block set 210 are described below in connection with FIG. 5.

Controls 200 include a set of blocks 220 which are structured to determine a temperature profile value. In set 220, value 215 is provided as an input to block 224 along with inputs 222. In the illustrated embodiment inputs 222 comprise current operating values for DOC outlet temperature, DPF outlet temperature, and SCR bed temperature. It shall be appreciated that each of inputs 222 provides information indicative of temperature of the SCR catalyst. The DOC outlet temperature and DPF outlet temperature may be utilized as an indirect indication and the SCR bed temperature bay be utilized as a direct indication. Block 224 is structured to determine a temperature profile value using value 215 and inputs 222. In certain forms, block 224 may be structured to select the minimum value from among value 215 and inputs 222. In certain embodiments, block 224 may determine the temperature profile value using a weighted computations or averages of value 215 and inputs 222. The temperature profile value determined by block 224 is provided as temperature profile value 225.

Controls 200 include a set of blocks 230 which are structured to calculate and filter a heat request. Closed-loop feedback controller 234 receives value 225 and temperature target value 231 as inputs, determines a difference between value 225 and temperature target 231, and provides the difference as an input to block 236. Block 236 also receives current exhaust flow value 232 as an input and determines a heat request using the received inputs. The heat request determined by block 236 is provided to block 238 along with the prediction horizon value 271.

Block 238 filters the heat request using the prediction horizon value 271. In certain embodiments, block 238 is structured as a first order filter that operates to distribute the heat request over the prediction horizon effective to optimize or minimize fuel consumption over the prediction horizon. A variety of other filtering techniques may also be utilized to optimize or minimize fuel consumption.

Figure 4:
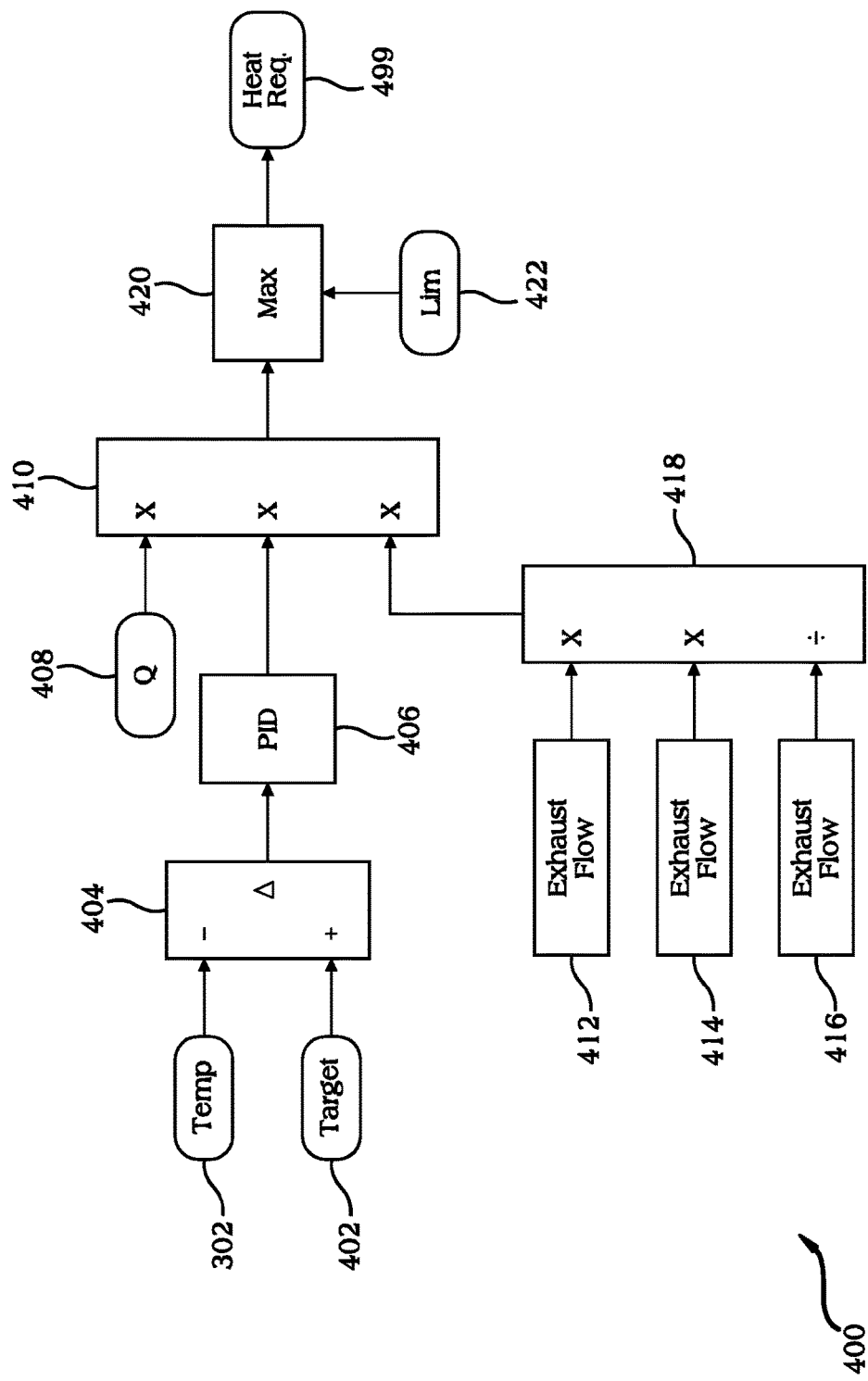

Block 238 provides a heat request flag 237 and a heat request value 239. Flag 238 and heat request value 239 are utilized in controlling operation of an engine system using the filtered heat request to increase a temperature of an SCR catalyst. This may be accomplished by controlling fueling to the engine to influence exhaust temperature, controlling turbocharger operation to influence intake charge temperature and thereby influence exhaust temperature, controlling charge cooler operation to influence intake charge temperature and thereby influence exhaust temperature, or by combinations of the foregoing and/or other techniques. Further details of one exemplary implementation of the features of set 230 are described below in connection with FIG. 4.

Figure 3:
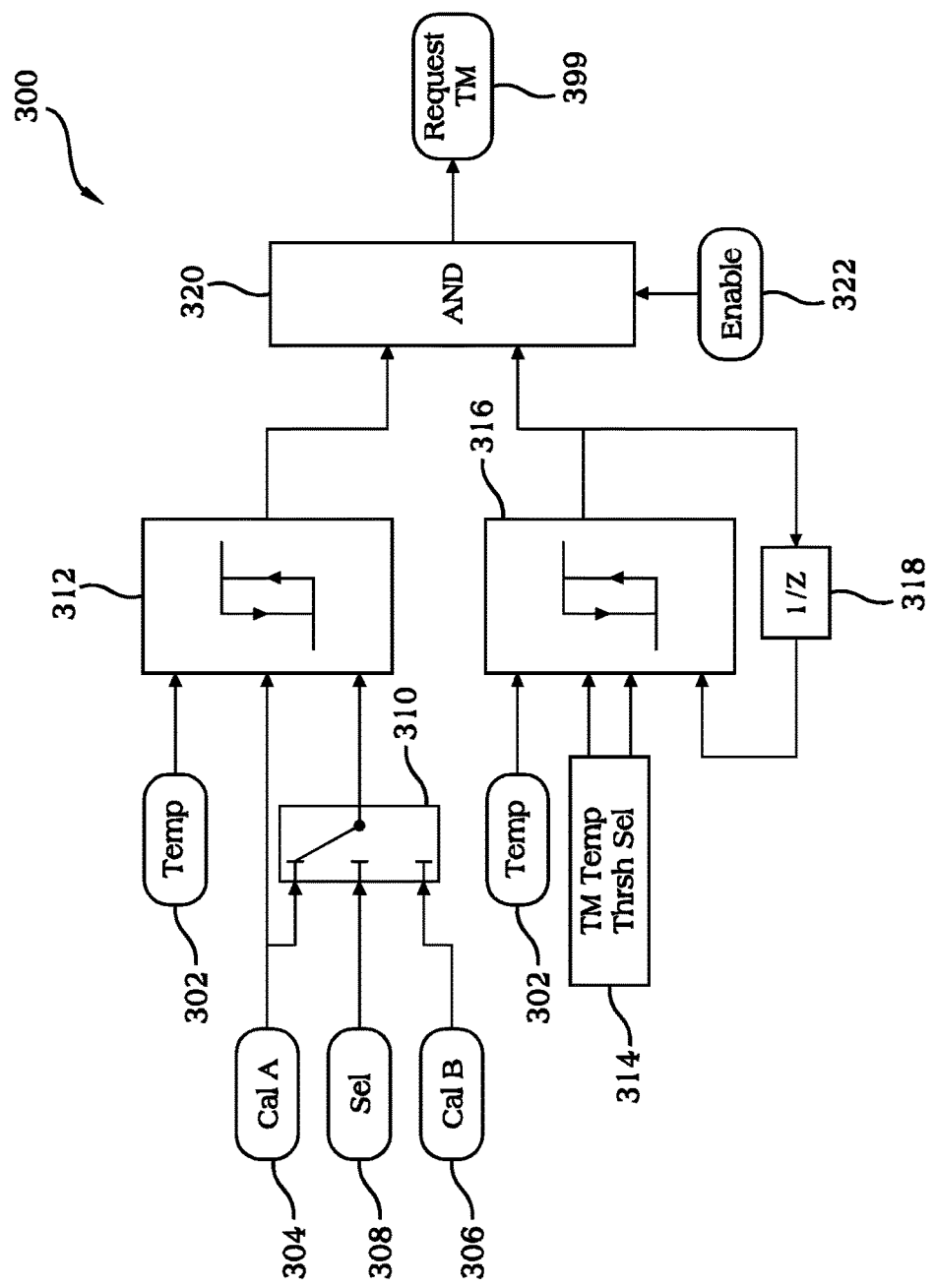

With reference to FIG. 3 there is illustrated a schematic block diagram of exemplary controls 300. Controls 300 may be implemented in one or more electronic control units of an electronic control system. For example, in the embodiment illustrated in FIG. 1 controls 300 may be implemented in ECU 130, TCU 140, EPM controller 150 or a combination thereof. Controls 300 are structured to determine a request for thermal management of an exhaust aftertreatment system including an SCR catalyst.

Temperature 302 is provided as an input to hysteresis block 312. In certain embodiments, temperature 302 is configured to be the temperature profile provided as value 225 in controls 200 described above. In other embodiments, temperature 302 is configured to be another value indicative of a SCR catalyst temperature. Calibratible 304 is provided as a high threshold input to hysteresis block 312 and also provided as an input to selection switch 310. Calibratible 306 is provided as another input to selection switch 310. Selection input 308 is utilized to select which of the two inputs output by switch 310. Depending on the state of input 308, either calibratible 304 or calibratible 306 may be provided as the low threshold input to block 312. Input 308 may be used to account for de-rated engine operation by selecting calibratible 306 as the output during normal engine operation and selecting calibratible 304 as the output during de-rated engine operation.

Temperature 302 is also provided as an input to hysteresis block 316. Temperature threshold selection block 314 provides the high threshold and low thresholds inputs to block 316. Block 314 may be structured to provide various high and low thresholds inputs to block 316 depending on the operating state of the engine. In certain embodiments, block 314 provides a one set of high and low thresholds inputs to block 316 when the engine is running and another set of high and low thresholds inputs to block 316 when the engine is not running. This technique may be utilized to avoid thermal management requests when the engine is not running. Block 316 also receives feedback of its most recent output value as an input from block 318. This feedback may be utilized to restore operation in the event that operation of controls 300 is interrupted.

The outputs of blocks 312 and 316 are provided as inputs to logical AND operator block 320. Enable input 322 is also provided to block 320 and may be utilized to selectably enable or disable controls 300 based on criteria such as a delay timeout and/or an override condition. Block 320 provides a logical true/false thermal management request value as output 399 which may be utilized in determining whether to request thermal management of an exhaust aftertreatment system including an SCR catalyst With reference to FIG. 4 there is illustrated a schematic block diagram of exemplary controls 400. Controls 400 may be implemented in one or more electronic control units of an electronic control system. For example, in the embodiment illustrated in FIG. 1 controls 400 may be implemented in ECU 130, TCU 140, EPM controller 150 or a combination thereof. Controls 400 are structured to calculate a heat request that can be used by an electronic control system to provide thermal management of an exhaust aftertreatment system including an SCR catalyst.

In controls 400, temperature 302 and temperature target 402 are provided as inputs to difference operator block 404 which calculates a difference between these inputs and outputs the difference to closed-loop feedback controller 406. In the illustrated embodiment, closed-loop feedback controller 406 is structured as a PID controller. In other embodiments other types of closed-loop feedback controllers may be utilized, for example, PI controllers. Controller 406 may determine its outputs based on a combination of the proportional, integral, and differential operations. In certain embodiments controller 406 may determine its output as a sum of a proportional operation which multiplies the received difference value by a proportional gain value, an integral operation which integrates the received difference value multiplied by an integral gain value, and a derivative operation which determines a derivative of the received difference value multiplied by a differential gain value.

Controller 406 provides its output to operator 210. Operator 210 also receives as inputs a specific heat (Q) value 408 and the output of operator 418. Operator 418 receives exhaust flow 412, time step 414, and conversion to seconds value 416 as inputs and outputs an exhaust mass flow determined using these inputs. Operator 210 is structured to calculate a heat request value in terms of Joules in accordance with Equation (1):

$$\text{Heat Request} = \text{Exhaust Mass Flow} \times \text{Specific Heat} \times \text{Temperature Difference} \quad (1)$$

The heat request output by block 410 and a limit 422 are provided to block 420 which outputs the maximum of its inputs as heat request value 499. Heat request value 499 is utilized in controlling operation of an engine system to increase a temperature of an SCR catalyst. This may be accomplished by controlling fueling to the engine to influence exhaust temperature (e.g., by increasing and/or delaying fuel injection), controlling turbocharger operation to influence intake charge temperature and thereby influence exhaust temperature, controlling charge cooler operation to influence intake charge temperature and thereby influence exhaust temperature, or by combinations of the foregoing and/or other techniques.

Figure 5:
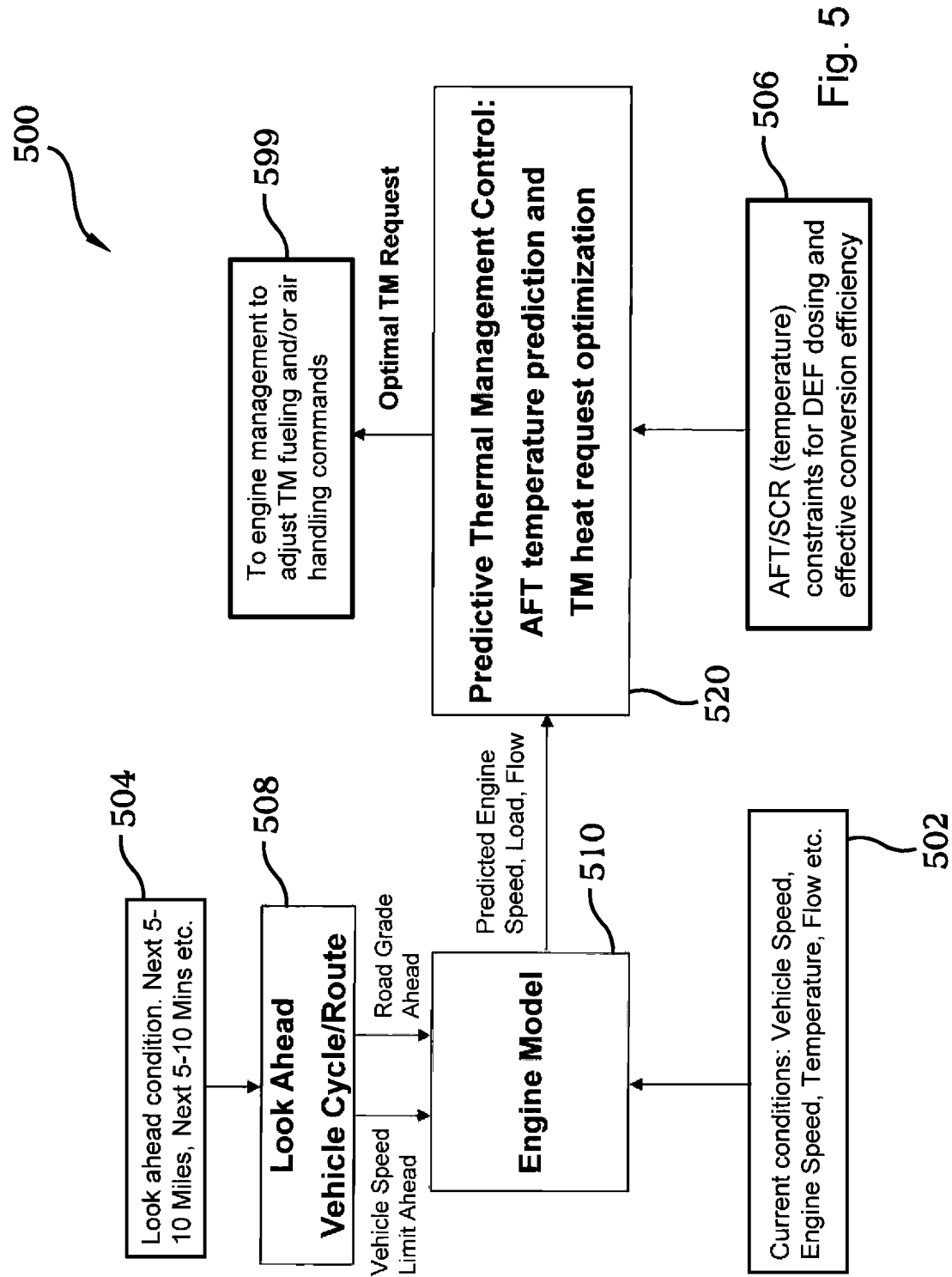

With reference to FIG. 5 there is illustrated a schematic block diagram of exemplary controls 500. Controls 500 may be implemented in one or more electronic control units of an electronic control system. For example, in the embodiment illustrated in FIG. 1 controls 500 may be implemented in ECU 130, TCU 140, EPM controller 150 or a combination thereof. Controls 500 are structured to determine fueling and/or air handling commands to provide thermal management of an exhaust aftertreatment system including an SCR catalyst.

Controls 500 include an engine model block 510 which receives current operating conditions inputs 502. In the illustrated embodiment, current operating conditions inputs 502 include vehicle speed, engine speed, exhaust temperature, and exhaust flow. Other embodiments utilize additional or alternate inputs. Block 510 also receives look-ahead inputs from block 508. In the illustrated embodiment, the look-ahead inputs include future vehicle speed, and future road grade over a future time or distance range. Other embodiments may utilize additional or alternate look-ahead information as inputs to block 510. Block 508 is structured to determine the look-ahead inputs that it provides to block 510 using look-ahead conditions 504 which are received from a system external to the vehicle system in which controls 500 are implemented. Look-ahead conditions 504 may include conditions for a future time period or a future distance. A variety of conditions may be utilized as inputs to block 508 including, for example, GPS position, road grade information, vehicle speed information, speed limit information, and other information from which a future vehicle speed and a future road grade may be determined.

Block 510 is structured to model operation of the engine and to determine a predicted future engine speed, a predicted future engine load, and a predicted future exhaust flow based upon the current operating condition inputs 502 and the look-ahead inputs received from block 508. Block 510 may be structured to operate a physics-based model that determines its output values by considering current engine operating conditions, and future conditions encountered by the vehicle (e.g., vehicle speed and road grade). The engine model may be structured to include fueling and air handling governing controls where a predicted load on engine and a current engine operating conditions are utilizes as inputs and predicted exhaust profiles including flows and temperatures are provided as outputs to predictive thermal management control block 520.

The predicted future engine speed, predicted future engine load, and predicted future exhaust flow determined by block 510 are provided to block 520. Block 520 also receives constraints 506 which indicate an aftertreatment temperature constraint for reductant dosing and effective SCR conversion efficiency. Block 520 is structured to implement a predictive thermal management control that determines a predicted temperature indicative of a predicted future temperature of the SCR catalyst and a thermal management request. The predicted temperature may consider current SCR temperature and other current exhaust aftertreatment system temperatures and calculate a future predicted temperature based on a predicted future engine speed, a predicted future engine load and a predicted future exhaust flow. The thermal management request is provided as value 599 which is then used to control operation of the engine (e.g., control fueling and/or air-handling) to increase a temperature of the SCR catalyst.

Figure 6:
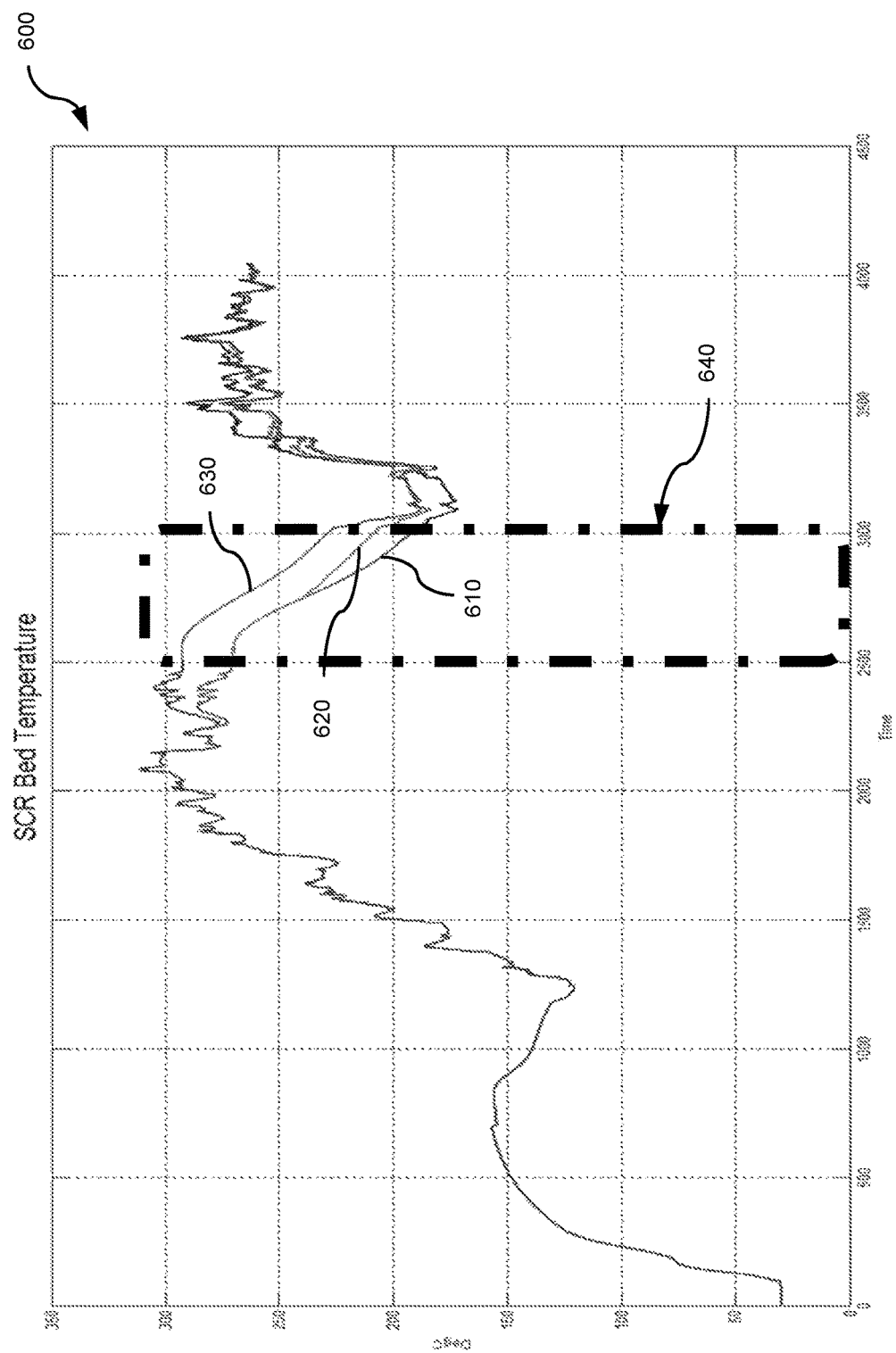
FIG. 6 is a graph illustrating attributes of several different thermal management controls for an exhaust aftertreatment system.

With reference to FIG. 6 there is illustrated a graph 600 of SCR bed temperature in degrees C. (indicated on the Y axis) as a function of time (indicated on the X axis). Graph 600 depicts operating region 640 in which an engine experiences a low speed or idle operation. Graph 600 depicts curves 610, 620 and 630. Curve 610 illustrates the variation in SCR bed temperature for a control strategy that initiates SCR thermal management providing 5 mg of post injection fueling per stroke for 10 minutes when SCR bed temperature drops below a threshold of 200 degrees C. Curve 620 illustrates the variation in SCR bed temperature for a control strategy that initiates SCR thermal management providing 5 mg of post injection fueling per stroke for 10 minutes when the engine starts idling. Curve 630 illustrates the variation in SCR bed temperature for a control strategy that initiates SCR thermal management providing 2.5 mg of post injection fueling per stroke for 10 minutes when a predicted future SCR bed temperature drops below a threshold of 200 degrees C. Thermal management for curve 630 is initiated in advance of (i.e., prior to) a temperature threshold for thermal management being met. By comparison of curves 610, 620 and 630 it can be seen that the curve 630 provides higher SCR temperature during low speed/idle operation with less fueling. An effect of increased temperature with reduced fueling has also been discovered for systems that utilize the real-time heat request control techniques such as described in connection with FIGS. 3-4, and for systems that utilize control techniques including both future predictions of SCR temperature and real-time heat request techniques in combination.

Various aspects of the present disclosure are contemplated. According to one aspect, a method includes: operating a vehicle system comprising an internal combustion engine system structured to provide exhaust to an exhaust aftertreatment system comprising an SCR catalyst, and an electronic control system in operative communication with the internal combustion engine system and the exhaust aftertreatment system; and operating the electronic control system to perform the acts of determining a predicted temperature value indicative of a predicted future temperature of the SCR catalyst, determining a temperature profile value using the predicted temperature value and a current temperature value indicative of a current temperature of the SCR catalyst, operating a closed-loop controller to provide an output indicating a difference between the temperature profile value and a temperature target, determining a heat request using the output of the closed-loop controller, filtering the heat request using a prediction horizon, and controlling operation of the engine system using the filtered heat request to increase a temperature of the SCR catalyst.

In one embodiment, the act of operating the closed-loop controller is performed repeatedly to provide the output in real time. In another embodiment, the act of filtering utilizes a first order filter to distribute the heat request over the prediction horizon. In yet another embodiment, the act of controlling includes controlling fueling to increase temperature of the SCR catalyst, controlling air handling to increase temperature of the SCR catalyst, or a combination of both controlling fueling and controlling air handling to increase temperature of the SCR catalyst. In yet another embodiment, the act of determining a predicted temperature value includes receiving information about conditions at a location remote from the vehicle system from an external system and determining a predicted future speed of the vehicle system and a predicted future road grade for the vehicle system. In still another embodiment, the closed-loop controller comprises a PID controller.

According to another aspect, a vehicle system includes an internal combustion engine structured to output exhaust to an exhaust aftertreatment system comprising an SCR catalyst. The vehicle system also includes an electronic control system in operative communication with the internal combustion engine system and the exhaust aftertreatment system. The electronic control system includes a non-transitory computer readable medium structured to store instructions executable by the electronic control system to determine a first temperature value indicative of a predicted future temperature of the SCR catalyst, determine a second temperature value using the first temperature value and a third temperature value indicative of a current temperature of the SCR catalyst, operate a closed-loop controller to provide an output indicating a difference between the second temperature value and a temperature target, determine a heat request using the output of the closed-loop controller, filter the heat request using a prediction horizon, and control operation of the engine using the filtered heat request to increase a temperature of the SCR catalyst.

In one embodiment of the system, the closed-loop controller is structured to provide real time output indicating the difference. In another embodiment of the system, the instructions to filter are structured to distribute the heat request over the prediction horizon. In yet another embodiment, the instructions to control comprise instructions to one or both of increase a fueling quantity and delay a fuel injection. In still another embodiment, the instructions to determine a predicted temperature value are configured to receiving information from an external system and determining a predicted future speed of the vehicle system and a predicted future road grade for the vehicle system. In another embodiment, the closed-loop controller is structured as a PID controller.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. A method comprising:
   operating a vehicle system comprising an internal combustion engine system structured to provide exhaust to an exhaust aftertreatment system comprising an SCR catalyst, and an electronic control system in operative communication with the internal combustion engine system and the exhaust aftertreatment system; and
   operating the electronic control system to perform the acts of
   determining a predicted temperature value indicative of a predicted future temperature of the SCR catalyst,
   determining a temperature profile value using the predicted temperature value and a current temperature value indicative of a current temperature of the SCR catalyst,
   operating a closed-loop controller to receive the temperature profile value as a first input, receive a target temperature as a second input, and provide an output indicating a difference between the temperature profile value and the temperature target,
   determining a heat request using the output of the closed-loop controller,
   filtering the heat request using a prediction horizon, and
   controlling operation of the engine system using the filtered heat request to increase a temperature of the SCR catalyst.

2. The method of claim 1 wherein the act of operating the closed-loop controller is performed repeatedly to provide the output in real time.

3. The method of claim 1 wherein the act of filtering utilizes a first order filter to distribute the heat request over the prediction horizon.

4. The method of claim 1 wherein the act of controlling comprises controlling fueling to increase temperature of the SCR catalyst, controlling air handling to increase temperature of the SCR catalyst, or a combination of both controlling fueling and controlling air handling to increase temperature of the SCR catalyst.

5. The method of claim 1 wherein the act of determining a predicted temperature value includes receiving information about conditions at a location remote from the vehicle system from an external system.

6. The method of claim 5 wherein the act of determining a predicted temperature value includes determining a predicted future speed of the vehicle system and a predicted future road grade for the vehicle system.

7. A vehicle system comprising:
an internal combustion engine structured to output exhaust to an exhaust aftertreatment system comprising an SCR catalyst; and
an electronic control system in operative communication with the internal combustion engine system and the exhaust aftertreatment system, the electronic control system comprising a non-transitory computer readable medium structured to store instructions executable by the electronic control system to
determine a first temperature value indicative of a predicted future temperature of the SCR catalyst,
determine a second temperature value using the first temperature value and a third temperature value indicative of a current temperature of the SCR catalyst,
operate a closed-loop controller to receive the temperature profile value as a first input, receive a target temperature as a second input, and provide an output indicating a difference between the temperature profile value and the temperature target,
determine a heat request using the output of the closed-loop controller,
filter the heat request using a prediction horizon, and
control operation of the engine using the filtered heat request to increase a temperature of the SCR catalyst.

8. The vehicle system of claim 7 wherein the closed-loop controller is structured to provide real time output indicating the difference.

9. The vehicle system of claim 7 wherein the instructions to filter are structured to distribute the heat request over the prediction horizon.

10. The vehicle system of claim 7 wherein the instructions to control comprise instructions to one or both of increase a fueling quantity and delay a fuel injection.

11. The vehicle system of claim 7 wherein the instructions to determine a predicted temperature value are configured to receiving information from an external system and determining a predicted future speed of the vehicle system and a predicted future road grade for the vehicle system.

12. The vehicle system of claim 7 wherein the closed-loop controller is structured as a PID controller.

13. A non-transitory controller-readable memory medium configured with instructions executable by a controller adapted to command operation of a vehicle system including an internal combustion engine operatively coupled with an SCR catalyst, the instructions being executable by the controller to perform a plurality of acts comprising:
determining a predicted temperature value indicative of a predicted future SCR catalyst temperature;
determining a temperature profile value using the predicted temperature value and a current temperature value indicative of a current SCR catalyst temperature;
determining a difference between the temperature profile value and a temperature target in response to the temperature profile value and the temperature target being provided as inputs to a closed-loop controller;
determining a heat request using the difference between the temperature profile value and the temperature target;
filtering the heat request using a prediction horizon; and
outputting a command adapted to control operation of the vehicle system using the filtered heat request to increase a temperature of the SCR catalyst.

14. The non-transitory controller-readable memory medium of claim 13 wherein the act of filtering distributes the heat request over the prediction horizon.

15. The non-transitory controller-readable memory medium of claim 14 wherein the act of filtering is effective to minimize fuel consumption over the prediction horizon.

16. The non-transitory controller-readable memory medium of claim 13 wherein the act of outputting comprises outputting a fueling command configured to increase temperature of the SCR catalyst.

17. The non-transitory controller-readable memory medium of claim 13 wherein the act of outputting comprises outputting an air handling command configured to increase temperature of the SCR catalyst.

18. The non-transitory controller-readable memory medium of claim 13 wherein the act of determining a predicted temperature value includes processing information about conditions at a location remote from the vehicle system.

19. The non-transitory controller-readable memory medium of claim 18 wherein the act of processing information about conditions at the location remote from the vehicle system includes determining a predicted future speed of the vehicle system at the location and a predicted future road grade for the vehicle system at the location.

20. The non-transitory controller-readable memory medium of claim 13 wherein the controller comprises one of a PID controller and a PI controller.

* * * * *